United States Patent
Horng et al.

(10) Patent No.: US 6,448,675 B1
(45) Date of Patent: Sep. 10, 2002

(54) ROTATIONAL BALANCING STRUCTURE FOR AN A.C. MOTOR

(75) Inventors: Alex Horng, Kaohsiung (TW); Wen-Shung Wu, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/964,706

(22) Filed: Sep. 28, 2001

(51) Int. Cl.$^7$ .......................... H02K 5/24; H02K 17/00; H02K 11/00; H02K 7/09; H02K 20/02
(52) U.S. Cl. .................. 310/67 R; 310/51; 310/156.04; 310/90.5
(58) Field of Search .......................... 310/67 R, 156.82, 310/51, 62, 63, 68 R, 211, 49 R, 156.04, 90.5; 318/254

(56) References Cited

U.S. PATENT DOCUMENTS

| | | | | |
|---|---|---|---|---|
| 4,686,400 A | * | 8/1987 | Fujisaki et al. | 310/156.05 |
| 4,891,567 A | * | 1/1990 | Fujitani et al. | 310/68 R |
| 5,099,181 A | * | 3/1992 | Canon | 310/62 |
| 5,197,858 A | * | 3/1993 | Cheng | 318/473 |
| 5,281,879 A | * | 1/1994 | Satake et al. | 310/114 |
| 5,379,999 A | * | 1/1995 | Barzideh et al. | 271/195 |
| 5,506,458 A | * | 4/1996 | Pace et al. | 310/254 |
| 5,543,672 A | * | 8/1996 | Nishitani et al. | 188/164 |
| 5,973,428 A | * | 10/1999 | Zakrocki et al. | 310/217 |
| 6,081,057 A | * | 6/2000 | Tanaka et al. | 310/156.04 |
| 6,278,248 B1 | * | 8/2001 | Hong et al. | 310/63 |
| 6,285,108 B1 | * | 9/2001 | Horng | 310/194 |
| 6,376,946 B1 | * | 4/2002 | Lee | 310/254 |

FOREIGN PATENT DOCUMENTS

JP        10197544 A  *  7/1998

* cited by examiner

Primary Examiner—Karl Tamai
Assistant Examiner—Julio Gonzalez Ramirez
(74) Attorney, Agent, or Firm—Bacon & Thomas

(57) ABSTRACT

A rotational balancing structure for an A.C. motor comprises a casing having an axle seat for rotatably holding a shaft of a rotor. A balancing sheet and a stator are mounted in the casing. The stator comprises plural stacked silicon steel plate wound around by a winding. An insulating ring is mounted to an end of the stator. Each of the stator and the insulating ring has a central hole. The rotor comprises an induction ring that is received in the central hole of the stator with an end face of the induction ring extending through the central hole of the stator for mutual attraction with the balancing sheet fixed on the casing.

9 Claims, 3 Drawing Sheets

ROTATIONAL BALANCING STRUCTURE FOR AN A.C. MOTOR

BACKGROUND OF THE INVENTION

1. Field of the Invention

The present invention relates to a rotational balancing structure for an A. C. (alternating current) motor to provide an improved rotational balance while the A.C. motor is operating.

2. Description of the Related Art

Applicant U.S. patent application Ser. No. 09/327,188 filed on Jun. 7,1999 and entitled RUSHLESS D.C. MOTOR ASSEMBLY discloses a brushless D.C. motor assembly comprising a balancing sheet made of material with magnetic conductivity. The balancing sheet and a stator are coupled by an axle seat, and a shaft of a rotor is rotatably mounted in the axle seat, thereby allowing mutual attraction between a permanent magnet on the rotor and the balancing sheet. Thus, the rotor has an improved rotational balance when it rotates.

SUMMARY OF THE INVENTION

An object of the present invention is to provide a rotational balancing structure for an A.C. motor that provides an improved rotational balance and reduces noise during rotation. A rotational balancing structure for an A.C. motor comprises a casing having an axle seat for rotatably holding a shaft of a rotor. A balancing sheet and a stator are mounted in the casing. The stator comprises plural stacked silicon steel plate wound around by a winding. An insulating ring is mounted to an end of the stator. Each of the stator and the insulating ring has a central hole. The rotor comprises an induction ring that is received in the central hole of the stator with an end face of the induction ring extending through the central hole of the stator for mutual attraction with the balancing sheet fixed on the casing.

Other objects, specific advantages, and novel features of the invention will become more apparent from the following detailed description and preferable embodiments when taken in conjunction with the accompanying drawings.

Detailed Description of the Preferred Embodiments

Preferred embodiments in accordance with the present invention will now be described with reference to the accompanying drawings.

Figure 1:
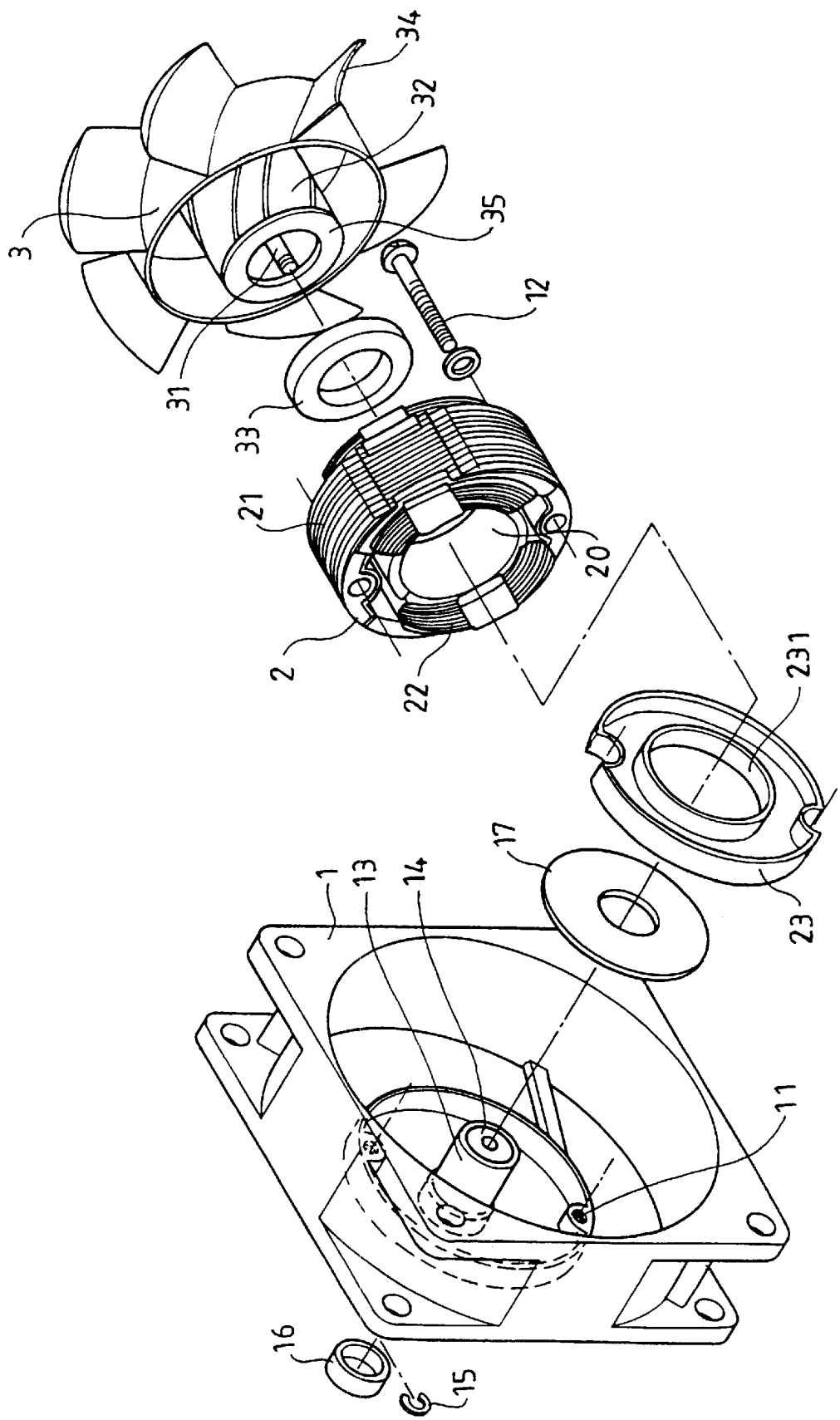
FIG. 1 is an exploded perspective view of a preferred embodiment of a rotational balancing structure for an A.C. motor rotor in accordance with the present invention.

Referring to FIG. 1 that illustrates a preferred embodiment in accordance with the present invention, an A.C. motor generally comprises a casing 1, a stator 2, and a rotor 3.

The casing 1 may be one for forming a casing of the A.C. motor. As illustrated in FIG. 1, the casing 1 may be a casing frame for a heat-dissipating fan. The casing 1 comprises a fixing portion 11 with screw holes through which fasteners 12 (such as bolts) extend for securely positioning the stator in place. The casing 1 comprises an axle seat 13 for rotatably holding a shaft 31 of a rotor 3. In order to allow smooth rotation of the rotor 3, a bearing 14 is mounted in the axle seat 13 for rotatably holding the shaft 31 of the rotor 3, and a retainer 15 (such as a C-clip) is provided to retain the shaft 31 in place. A closing member 16 is provided to enclose an end face of the axle seat 13. In addition, the shaft 31 has an end face that rotatably rests on the closing member 16 in a stable manner. A balancing sheet 17 is mounted around the axle seat 13 and made of a magnetically conductive material.

The stator 2 comprises conventional silicon steel plates 21 wound around by a winding 22. The stator 2 comprises a central hole 20 for receiving an induction ring 32 of the rotor 3. In addition, the stator 2 is securely mounted on the base 1 by fasteners 12. Mounted to the stator 2 at a position adjacent to the casing 1 is an insulating ring 23 having a central hole 231, the central hole 231 having an enlarged diameter and aligning with the central hole 231 of the stator 2. The insulating ring 23 keeps the silicon steel plates 21 of the stator 2 from contacting with the balancing sheet 17. The balancing sheet 17 extends beyond the central hole 231 of the insulating ring 23. Furthermore, the insulating ring 23 presses against and thus positions the balancing sheet 17.

The shaft 31 of the rotor 3 is rotatably received in the axle seat 13 of the casing 1 and is retained in place by the retainer 15. In addition, the end face of the shaft 31 rotatably rests on the closing member 16 in a stable manner. The induction ring 32 of the rotor 3 is received in the central hole 20 of the stator 2 for mutual induction with the silicon steel plates 21 of the stator 2. In addition, an end face of the induction ring 32 extends through the central hole 20 of the stator 2 for mutual attraction with the balancing sheet 17 fixed on the casing 1. Alternatively, an insulating layer 35 is formed on the end face of the induction ring 32, and a permanent ring magnet 33 is adhered to the insulating layer 35 to provide an insulation between the permanent ring magnet 33 and the induction ring 32. In addition, the permanent ring magnet 33 and the balancing sheet 17 fixed on the casing 1 attract each other. The rotor 3 may comprise blades 34 to form a heat-dissipating fan.

Figure 2:
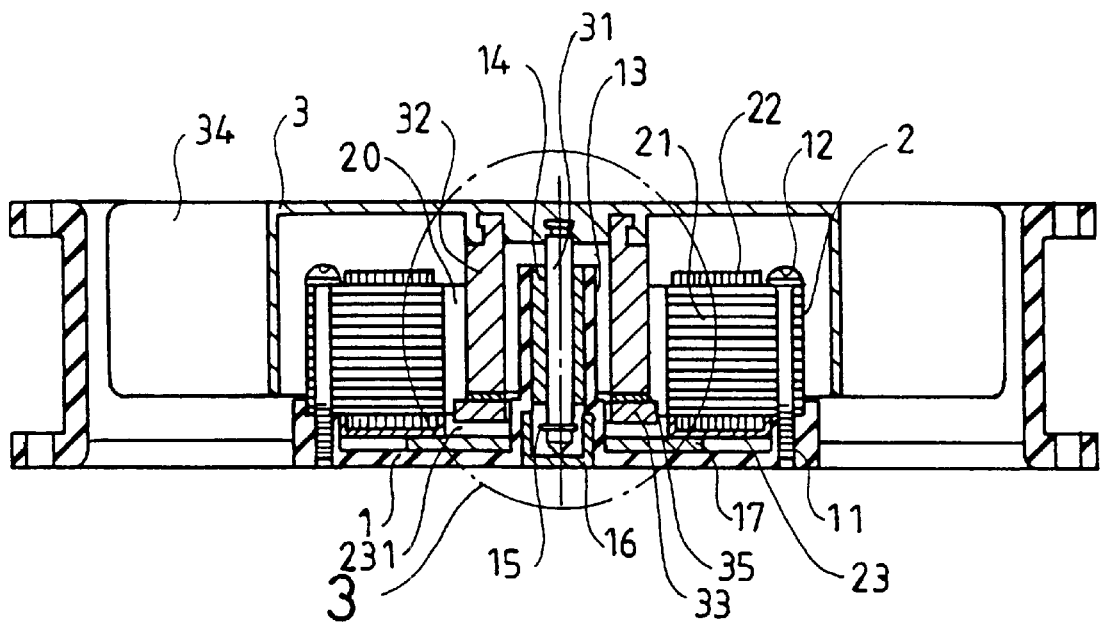
FIG. 2 is a sectional view of the rotational balancing structure in FIG. 1.
Figure 3:
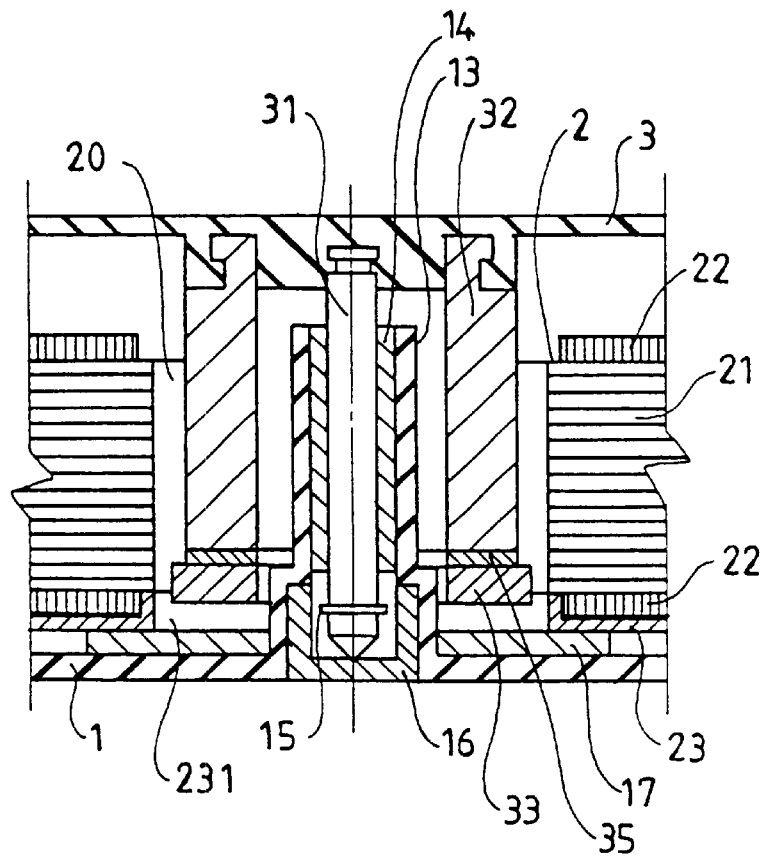
FIG. 3 in enlarged view of a circle in FIG. 2.

As illustrated in FIGS. 2 and 3, in use, the stator 2 is fixed on the casing 1, and the balancing sheet 17 is mounted between the stator 2 and the casing 1. The balancing sheet 17 is pressed against and thus positioned by the insulating ring 23. The end face of the shaft 31 of the rotor 3 is rotatably received in the axle seat 13 of the casing 1. The permanent ring magnet 33 on the end face of the induction ring 32 of the rotor 3 is located above the balancing sheet 17. Thus, when the rotor 3 rotates, the permanent ring magnet 33 and the balancing sheet 17 attract each other to provide a more stable rotation for the rotor 3.

Figure 4:
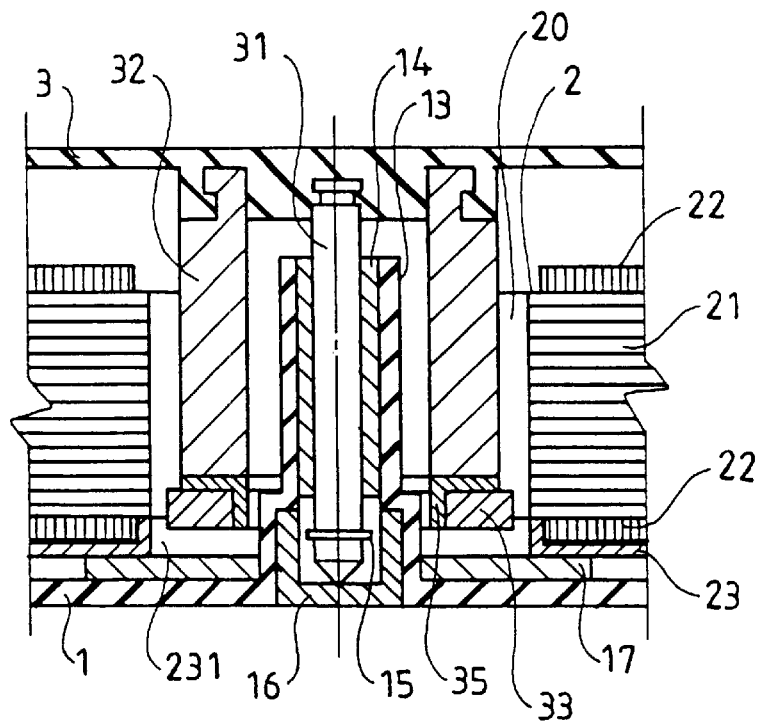
FIG. 4 is a sectional view similar to FIG. 3, illustrating a modified embodiment of a permanent ring magnet of the rotational balancing structure in accordance with the present invention.

FIG. 4 illustrates a further embodiment for fixing the permanent ring magnet 33 and the insulating layer 35. The insulating layer 35 is firstly adhered by an adhesive agent to the end face of the induction ring 32 of the rotor 3, and the insulating layer 35 comprises an annular wall to allow forcible insertion of the permanent ring magnet 33, thereby achieving the fixing purpose. Namely, the permanent ring magnet 33 is securely positioned around the insulating layer 35.

Figure 5:
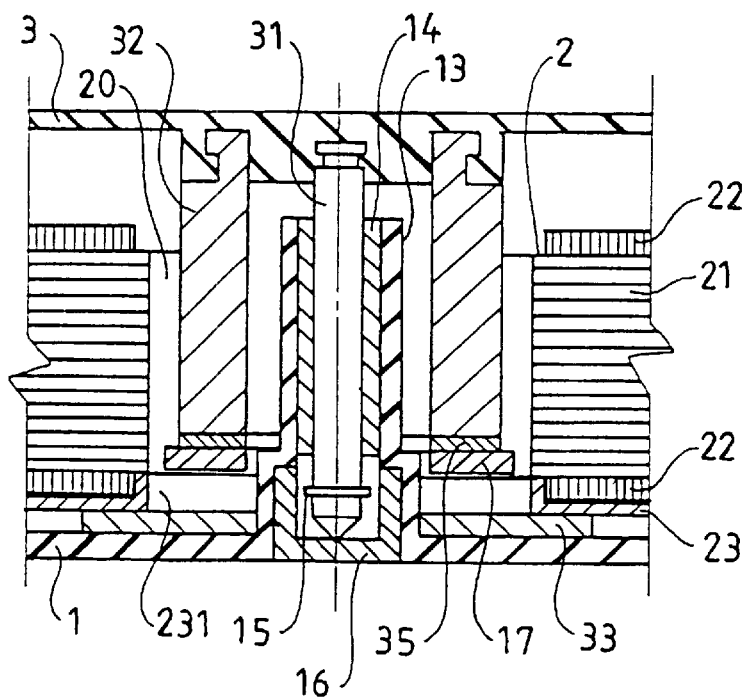
FIG. 5 is a sectional view similar to FIG. 3, illustrating another modified embodiment of the permanent ring magnet of the rotational balancing structure in accordance with the present invention.

FIG. 5 illustrates another embodiment of the invention, wherein the permanent ring magnet 33 and the balancing sheet 17 are interchanged. Namely, the permanent ring magnet 33 is fixed on the casing 1 and pressed against and thus positioned by the insulating ring 23, while the balancing sheet 17 is isolated by the insulating layer 35 and adhered to the end face of the induction ring 32 of the rotor 3.

The rotational balancing structure in accordance with the present invention allows a more stable rotation of the rotor by means of mutual attraction between the balancing sheet and the end face of the induction ring of the rotor or between the balancing sheet and the permanent ring magnet on the end face of the induction ring of the rotor.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A rotational balancing structure for an A.C. motor, comprising:
    a casing comprising an axle seat, a balancing sheet being mounted around the axle seat;
    a stator comprising plural silicon plates wound around by a winding, the stator further comprising a central hole, the stator being mounted on the casing;
    an insulating ring for isolating the stator from the balancing sheet, the insulating ring having a central hole;
    a rotor comprising an induction ring, the induction ring being received in the central hole of the stator, the induction ring comprising an end face, an insulating layer formed on the end face of the induction ring, a permanent ring magnet being adhered to the insulating layer, the permanent ring magnet and the balancing sheet fixed on the casing attracting each other.

2. The rotational balancing structure for an A.C. motor as claimed in claim 1, wherein the balancing sheet is pressed against the insulating ring and thus positioned by the insulating ring.

3. The rotational balancing structure for an A.C. motor as claimed in claim 1, further comprising an insulating layer formed on the end face of the induction ring of the rotor, a permanent ring magnet being adhered to the insulating layer, the permanent ring magnet and the balancing sheet fixed on the casing attracting each other.

4. The rotational balancing structure for an A.C. motor as claimed in claim 1, wherein the insulating layer is adhered by an adhesive agent to the end face of the induction ring of the rotor, the insulating layer comprising an annular wall, the permanent ring magnet being forcibly mounted around the insulating layer.

5. The rotational balancing structure for an A.C. motor as claimed in claim 1, further comprising a closing member fixed to the axle seat, the shaft of the rotor having an end face that rotatably rests on the closing member.

6. A rotational balancing structure for an A.C. motor, comprising:
    a casing comprising an axle seat, a permanent ring magnet being mounted around the axle seat;
    a stator comprising plural silicon plates wound around by a winding, the stator further comprising a central hole, the stator being mounted on the casing;
    an insulating ring for isolating the stator from the permanent ring magnet, the insulating ring having a central hole;
    a rotor comprising an induction ring, the induction ring being received in the central hole of the stator, the induction ring comprising an end face, an insulating layer and a balancing sheet being mounted to the end face of the induction ring the balancing sheet and the permanent ring magnet fixed on the casing attracting each other.

7. The rotational balancing structure for an A.C. motor as claimed in claim 1, wherein the permanent ring magnet is pressed against the insulating ring and thus positioned by the insulating ring.

8. The rotational balancing structure for an A.C. motor as claimed in claim 1, wherein the balancing sheet is adhered to the insulating layer formed on the end face of the induction ring of the rotor.

9. The rotational balancing structure for an A.C. motor as claimed in claim 1, further comprising a closing member fixed to the axle seat, the shaft of the rotor having an end face that rotatably rests on the closing member.

* * * * *